(12) United States Patent
Bellis, Sr.

(10) Patent No.: US 7,649,546 B1
(45) Date of Patent: Jan. 19, 2010

(54) IMAGE TRANSFER DEVICE

(76) Inventor: William B. Bellis, Sr., 2209 Heather La., Louisville, KY (US) 40218

( * ) Notice: Subject to any disclaimer, the term of this patent is extended or adjusted under 35 U.S.C. 154(b) by 1036 days.

(21) Appl. No.: 10/808,906

(22) Filed: Mar. 25, 2004

(51) Int. Cl.
*H04N 3/36* (2006.01)
*G03B 21/22* (2006.01)

(52) U.S. Cl. .......................................... 348/97; 353/76
(58) Field of Classification Search ............ 348/96–98, 348/373, 335, 110; 352/57, 1; 353/74, 76, 353/7; 359/629; 399/132; 250/201.1
See application file for complete search history.

(56) References Cited

U.S. PATENT DOCUMENTS

| | | | |
|---|---|---|---|
| 1,989,317 A | 1/1935 | Harper | |
| 2,854,901 A | 10/1958 | Fathauer | |
| 2,976,357 A | 3/1961 | Hammett | |
| 3,510,657 A * | 5/1970 | Meyer et al. | 250/201.1 |
| 3,718,760 A | 2/1973 | Patels et al. | |
| 3,814,853 A | 6/1974 | Lardeau | |
| 3,956,579 A | 5/1976 | Doumit | |
| 3,992,090 A * | 11/1976 | Lysle | 399/132 |
| 4,303,316 A * | 12/1981 | McElveen | 352/57 |
| 4,698,683 A * | 10/1987 | Schwartz et al. | 348/110 |
| 4,902,117 A * | 2/1990 | Papp | 359/629 |
| 5,025,320 A * | 6/1991 | Kyhl | 348/373 |
| 5,160,948 A * | 11/1992 | Bae | 352/1 |
| 6,702,445 B1 * | 3/2004 | Meng-Suen | 353/76 |
| 2003/0174292 A1 * | 9/2003 | White | 353/74 |
| 2005/0030478 A1 * | 2/2005 | Perisic | 353/7 |

* cited by examiner

*Primary Examiner*—Gims S Philippe
(74) *Attorney, Agent, or Firm*—Camoriano and Associates; Theresa Fritz Camoriano

(57) ABSTRACT

A media transfer device includes an inlet opening, an outlet opening, a screen, and a two-way mirror, such that, when an image is projected through the inlet opening and is reflected off of the two-way mirror onto the screen, a recorder located at the outlet opening may record the screen image as seen through the two-way mirror.

17 Claims, 4 Drawing Sheets

IMAGE TRANSFER DEVICE

BACKGROUND OF THE INVENTION

The present invention relates to a device for transferring an image, such as movies, slides, or film strips, into either an analog or a digital image, such as a digital video. More particularly, it relates to a device which allows the projection of an image such that the image may be captured and recorded without distortion.

Prior art methods for transferring media include the side-by-side placement of the projector and the recorder, with the projector projecting an image onto a screen, and the recorder recording the image off of the screen. In this situation, only the projector is aligned perfectly perpendicular to the projected image, while the camera that captures the image for the recorder is offset a bit, creating a parallax or "keystone" effect, which results in a distortion of the final recorded image. Another prior art method involves projecting the image onto the front side of a cloudy glass or similar see-through medium, so the cloudy glass becomes a type of see-through screen, with the camera viewing the projected image on the see-through screen by viewing through the back side of the screen. The difficulty with that arrangement is that it causes a substantial loss of picture quality.

SUMMARY OF THE INVENTION

The present invention provides a device which solves the problem of the parallax or "keystone" effect and which solves the problem of reduced image quality, while still providing a simple, inexpensive arrangement for the transfer of images. In a preferred embodiment, the device is a substantially enclosed box, which keeps dust and ambient light out. The image is projected onto a screen by reflecting it off of two mirrors, and the image is captured by a camera that views the screen through the second mirror. The focal length from the projector to the screen is short to keep the image small and sharp, and the mirrors are tilt-adjustable to ensure correct centering of the image on the screen. In the preferred embodiment, the positions of the camera and projector are also adjustable in order to help ensure that the image is squared relative to the screen and to the camera.

DESCRIPTION OF THE PREFERRED EMBODIMENT

Figure 1:
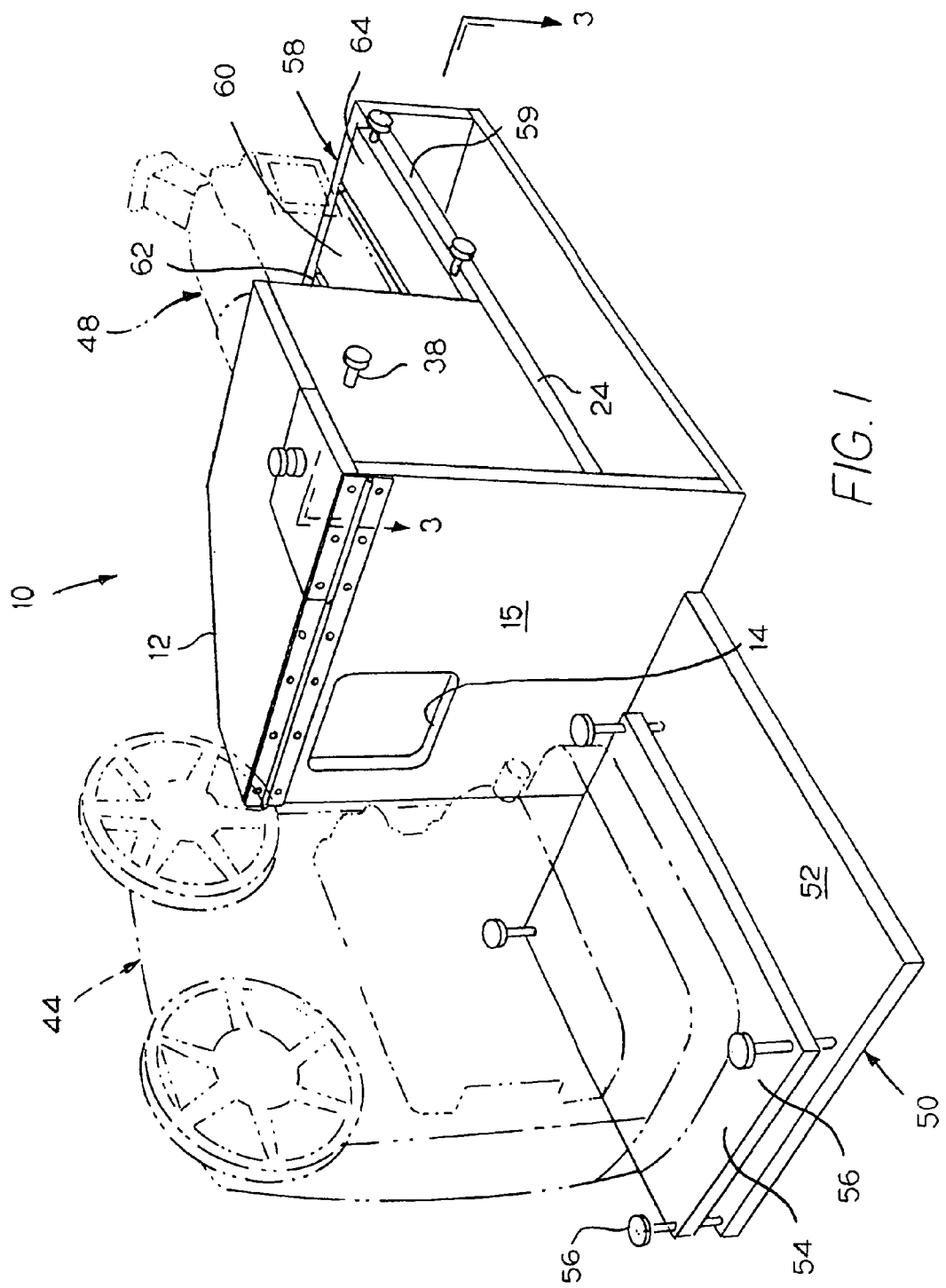
FIG. 1 is a perspective view of a media transfer device made in accordance with the present invention, with an analog movie projector and a digital camera shown in phantom.

FIGS. 1-4 show an example of a media transfer device 10 made in accordance with the present invention. This media transfer device 10 includes a box 12 having a first wall 15, defining an inlet opening 14, and a second wall 17, lying parallel to the first wall 15 and defining an outlet opening 16. A screen 18 lies flat against the inside of the first wall 15. In this example, the screen 18 is made of a separate piece of opaque material that fits inside opposed projecting grooves. It could instead simply be a portion of the wall 15 itself or some other suitable material for receiving and displaying the projected image. Inside the box 12 are a first mirror 20, which is a two-way mirror, and a second mirror 22.

The first mirror 20 in this preferred embodiment actually is a 60-40 mirror, which means that it reflects 60% of the light and transmits 40% through the glass. This partial reflection and partial transmission is achieved by applying the reflective coating as a sparse layer. Sometimes this is referred to as a "half silvered surface". The mirror 20 has a first side 20A and a second side 20B, and the reflective surface coating is on the first side 20A. The second mirror 22 also has two surfaces, 22A, 22B, and its reflective surface coating is on the first or inner side 22A. The second mirror 22 has a full reflective surface and does not transmit light through to the second side 22B.

Figure 2:
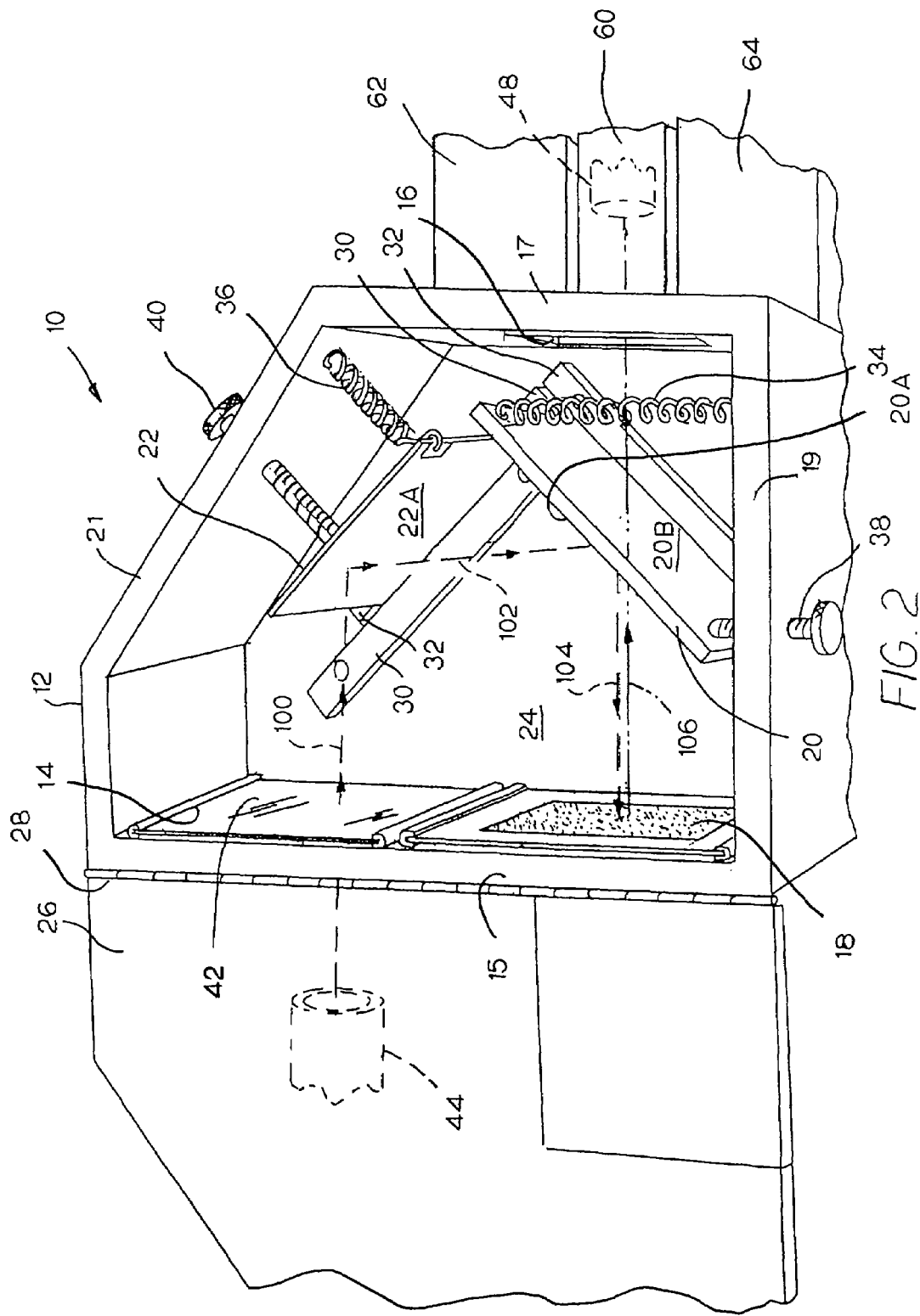
FIG. 2 is a broken-away, top perspective view of the device of FIG. 1, with the top cover shown open to reveal the internal components of the device.

The box 12 also includes a horizontal floor 24 and a top cover 26 which is hinged to the top edge of the first wall 15 by means of a piano hinge 28 in order to allow the cover 26 to be opened to provide access to the inside of the box 12, as shown in FIG. 2.

As seen best in FIG. 2, the mirrors 20, 22 rest on the floor 24 of the box 12, and the bottom edge of each mirror 20, 22 is sandwiched between two flat strips 30, 32 that are secured to the floor 24. The gap between each pair of flat strips 30, 32 is only slightly greater than the thickness of the respective mirror 20, 22, and the two gaps lie at right angles to each other. Springs 34, 36 are attached to the top edge of their respective mirrors 20, 22 and to their respective adjacent walls 19, 21 of the box 12 in order to provide biasing means which tend to pull the top edge of the respective mirrors 20, 22 outwardly toward the respective walls 19, 21 of the box 12. Thumb screws 38, 40 contact the rear face of their respective mirrors 20, 22 near the top edge of the mirror and are threaded through the respective walls 19, 21 of the box 12 to provide an adjustment to push or bias the top edge of the mirrors 20, 22 away from the respective walls 19, 21 of the box 12. This mounting arrangement allows the mirrors 20, 22 to be selectively tilted away from true vertical relative to the floor 24 of the box 12, the purpose of which will be explained later. While this mounting and adjustment arrangement is taught, various other known mounting and adjustment arrangements could be used.

Since the gaps between the pairs of strips 30, 32 lie at right angles to each other, the mirrors 20, 22 lie at right angles to each other. If one imagines the mirrors 20, 22 to lie on perpendicular planes corresponding to two legs of a right triangle, then the first wall 15 of the box 12 is a third plane, corresponding to the hypotenuse of that right triangle. The screen 18 and the inlet opening 14 lie on that wall 15. It should be noted that it is not necessary for the screen 18 and the inlet opening 14 to lie on the same plane.

In this example, the inlet opening 14 is covered by a transparent piece of glass 42, which prevents dust and other foreign particles, which may be stirred up by the fan in the projector 44, from entering the box 12 and collecting on the mirrors 20, 22. It also prevents the fan of the projector 44 from stirring up particles that are already in the air inside the box 12. (A similar glass may be used to cover the outlet opening 16 if desired.) The focal length between the projector lens 46 (See FIG. 2) and the screen 8 is preferably kept very short, on the order of eight-to-twelve inches, in order to keep the projected screen image small and sharp for higher resolution.

An image recording device 48 (such as a digital camera, an analog camera, or a charge-coupled device [CCD]) is located just outside the outlet opening 16, so it may record an image displayed on the screen 18 by receiving the screen image directly through the outlet opening 16 and through the two-way mirror 20, as explained in more detail below.

Both the projector 44 and the camera 48 are mounted on adjustable platforms that permit their positions to be adjusted relative to the screen 18. FIG. 1 depicts a mounting platform 50 for the projector 44. This platform 50 includes a base 52 and a rectangular cradle 54 including thumbscrews 56 at the four corners of the cradle 54. The pitch (nose up or nose down attitude) of the projector 44 and the roll (rock from side to side) of the projector 44 may be adjusted by selectively threading the thumbscrews 56 in or out. Note that the yaw of the projector 44 may be adjusted by simply changing the placement of the projector 44 on the cradle 54.

Figure 3:
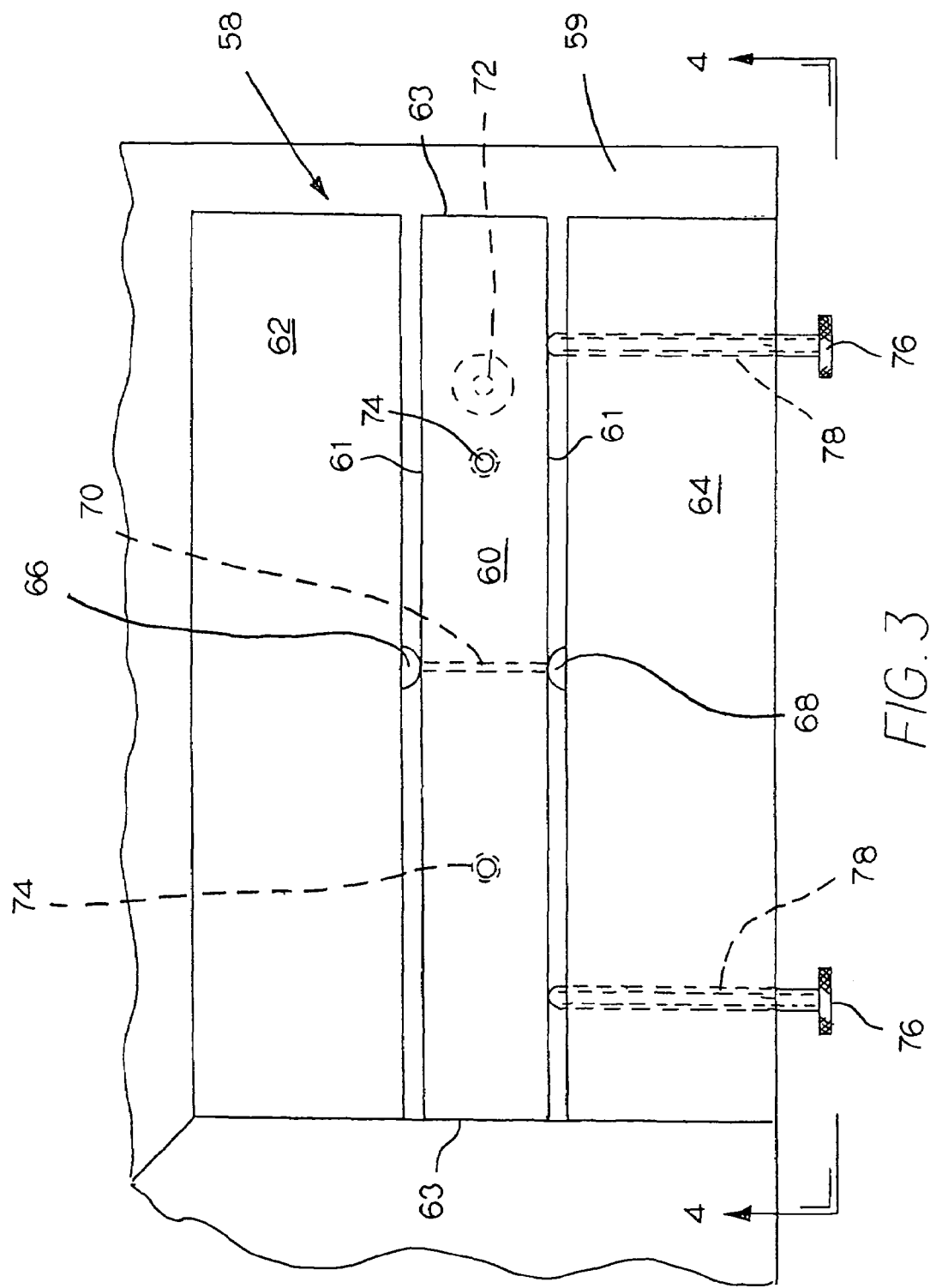
FIG. 3 is a view taken along line 3-3 of FIG. 1.
Figure 4:
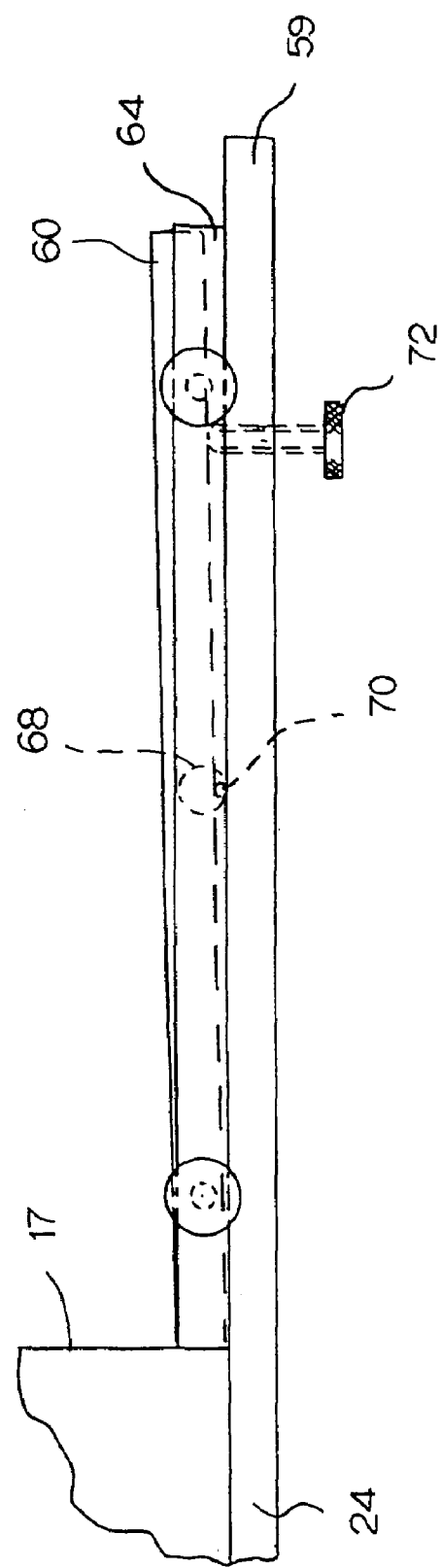
FIG. 4 is a view taken along line 4-4 of FIG. 3.

FIGS. 1, 3 and 4 depict a mounting platform 58 for the recording device 48. This platform 58 includes a fixed floor 59, which is an extension of the floor 24 of the box 10. Two rectangular blocks 62, 64 lie on top of and are fixed to the floor 59. A space is defined between the rectangular blocks 62, 64, and a rectangular cradle 60 lies in that space, resting on the floor 59. There are two adjustment mechanisms for adjusting the position of the cradle 60. First, the rectangular blocks 62, 64 have central rounded projections 66, 68, directed toward the cradle 60. The rectangular cradle 60 has two long sides 61 and two short sides 63. The long sides 61 lie between these two blocks 62, 64 in contact with the respective rounded projections 66, 68. Two thumbscrews 76 extend through threaded openings 78 in the rectangular block 64 and impact against one side 61 of the cradle 60. By threading in one of these thumbscrews 76 while simultaneously threading out the other, the cradle 60 is made to pivot about the rounded projections 66, 68, thus adjusting the yaw of the recording device 48, which is secured to the cradle 60 by means of screws (not shown) threaded through openings 74 in the cradle 60.

A second adjustment mechanism allows for adjustment of the pitch of the platform 60. A small linear projection 70, projecting upwardly from the top surface of the floor 59 between the two rounded projections 66, 68, is formed by a small gauge wire secured to the top surface of the floor 59. The cradle 60 functions as a small seesaw, with the linear projection 70 serving as the fulcrum. A thumbscrew 72, threaded up through the bottom of the floor 59, impacts against the bottom surface of the cradle 60 (as seen in FIG. 4) to raise or lower the back end of the cradle 60. The weight of the camera 48 is sufficiently to the rear of the fulcrum 70, that the screw 72 controls the position of the cradle 60 relative to the fulcrum 70, thereby controlling the pitch. The two threaded openings 74 (See FIG. 3) in the cradle 60, which permit the camera or other recording device 48 (See FIG. 1) to be secured to the cradle 60 by means of screws (not shown), are positioned as needed for the type of camera being used.

To use the image transfer device 10, an image is projected by the projector 44 along a first path 100 through the inlet opening 14 and through the clear glass 42 at the inlet opening 14. This first path 100 impinges on the surface of the mirror 22, preferably at an angle of 45 degrees. The image is then reflected off of the inner surface 22A of the mirror 22, along a second path 102, onto the inner surface 20A of the two-way mirror 20, impinging on the surface of the two-way mirror 20, preferably at an angle of 45 degrees. Then the image is reflected off of the inner surface 20A of the two-way mirror 20, along a third path 104, which directs it onto the screen 18. The image impinges on the screen 18 at a right angle. The pitch and roll of the projector 44 may be adjusted via the thumbscrews 56, and the tilt of the mirrors 22, 20 may be adjusted via the thumbscrews 40, 38, respectively, until the screen image is properly centered on the screen 18 and the third light path 104 of the projected image is perpendicular to the plane of the screen 18, with no keystone effects to distort the image. In this embodiment, the first light path 100 is substantially parallel to the third light path 104. Of course, since the mirror 20 is a 60-40 mirror, only about 60% of the light that passes along the second path 102 is reflected and directed onto the screen 18. About 40% of the light passing along the second path 102 passes straight through the mirror 20 and impinges on the wall 19 of the box. The wall 19 (as well as the other walls of the box) preferably are black, in order to absorb any light they receive.

It should be noted that, if only a single mirror were used, the image on the screen would be a mirror image of what is being projected. The use of two mirrors 20, 22 results in a true image on the screen 18, since it is a mirror image of a mirror image. However, the second mirror 22 is not strictly necessary if recording of a "mirror image" is not objectionable. In that case, the inlet opening 14 would be located along the wall 21, in line with the path 102, so as to allow the projector 44 to reflect the image directly against the first side 21A of the first mirror 20 (the two-way mirror) and then onto the screen 18.

A camera or other recording device 48 is placed on the mounting base 58, directly in line with the outlet opening 16 and the screen 18, so that the true, undistorted image on the screen 18 can be viewed by the camera 48 through the two-way mirror 20. The light from the projected image on the screen 18 travels along the light path 106 to the two-way mirror 20, preferably impinging on the mirror 20 at an angle of 45 degrees, with 40% of that light passing directly through the two-way mirror 20, and through the outlet opening 16, to the camera 48. While the amount of light that finally reaches the camera 48 is reduced from what was originally projected, the quality of the image is not substantially impaired. It would be necessary in any event to provide some filters for the light before it reaches the camera, so the filtering provided by the two-way mirror 20 is also beneficial in that respect. The light path 106 is aligned with the path 104, so there is no keystone effect.

The pitch and yaw of the recording device 48 may be adjusted via the thumbscrews 72, 76 to ensure proper alignment of the recording device 48 with the screen 18. It should be noted that, while the present embodiment depicts the recording device 48 aligned in a straight-line path 106 to the screen 18, it is possible to use one or more additional mirrors, if desired, to turn that path in a different direction, such that the recording device 48 need not necessarily be in a straight line path with the screen 18.

While the embodiment described above shows a simple means for adjusting the pitch, roll, and yaw of the projector and of the recording device, and the tilt of the mirrors, various other mounting mechanisms could be used to adjust and control these parameters. As also indicated in the description above, additional mirrors or fewer mirrors could be used to effect a similar end result. It will be obvious to those skilled in the art that various modifications may be made to the embodiment described above without departing from the scope of the present invention.

What is claimed is:

1. An image transfer device, comprising:
  a box including walls defining an inlet opening and an outlet opening;
  a screen;
  a first mirror, said first mirror being a two-way mirror and having first and second sides, wherein said openings, screen and first mirror are aligned such that, when an image is projected through said inlet opening and is reflected off of said first mirror onto said screen to form a screen image, the screen image can be viewed by looking through both said outlet opening and said first mirror;

and further comprising a means for controlling the tilt of said first mirror to enable centering of an image on said screen.

2. An image transfer device as recited in claim 1, wherein said means for controlling the tilt includes a first biasing means to urge the tilting of said first mirror in a first direction, and a second biasing means to urge the tilting of said first mirror in a second direction.

3. An image transfer device as recited in claim 2, wherein said first biasing means comprises a spring, and said second biasing means comprises a screw.

4. An image transfer device, comprising:
a box including walls defining an inlet opening and an outlet opening;
a screen;
a first mirror, said first mirror being a two-way mirror and having first and second sides, wherein said openings, screen and first mirror are aligned such that, when an image is projected through said inlet opening and is reflected off of said first mirror onto said screen to form a screen image, the screen image can be viewed by looking through both said outlet opening and said first mirror;
and further comprising a second mirror, wherein said openings, screen, first mirror, and second mirror are aligned such that, when an image is projected through said inlet opening, it is reflected off of said second mirror onto said first mirror and then onto said screen to form the screen image.

5. An image transfer device as recited in claim 4, and further comprising means for controlling the tilt of said first and second mirrors.

6. An image transfer device, comprising:
a box including walls defining an inlet opening and an outlet opening;
a screen;
first and second mirrors, said first mirror being a two-way mirror and having first and second sides, wherein said openings, screen and first and second mirrors are aligned such that, when an image is projected through said inlet opening, it is reflected off of said second mirror onto said first mirror and then onto said screen to form a screen image;
the screen image can be viewed by looking through both said outlet opening and said first mirror; and
wherein said first and second mirrors and said screen are located inside said box so as to define a first light path, which extends through said inlet opening and onto said second mirror, a second light path, which extends from said second mirror onto said first mirror, and a third light path, which extends from said first mirror and onto said screen such that said first and third light paths are substantially parallel to each other.

7. An image transfer device as recited in claim 6, and further defining a fourth light path, extending from said screen, through said first mirror, and through said outlet opening, wherein said fourth light path is aligned with said third light path.

8. An image transfer device as recited in claim 7, wherein a transparent window covers said inlet opening.

9. An image transfer device as recited in claim 8, and further comprising:
a projector platform aligned with said inlet opening, including means for adjusting the pitch and roll of said projector platform; and
a recorder platform aligned with said outlet opening, including means for adjusting the pitch and yaw of said recorder platform.

10. An image transfer device, comprising:
a box including walls defining an inlet opening and an outlet opening;
a screen inside said box aligned with said outlet opening;
a projector platform outside said box;
a projector mounted on said projector platform so that a light beam projected from said projector is aligned with and passes through said inlet opening;
a camera platform outside said box;
an image receiving device mounted on said camera platform aligned with said outlet opening and said screen; and
first and second mirrors mounted inside said box, said first mirror being a two-way mirror at a 45-degree angle to said screen, and said second mirror lying at right angles to said first mirror and at a 45-degree angle to said projector light beam, wherein the light beam projected from said projector is reflected off of said second mirror onto said first mirror and then is reflected off of said first mirror onto said screen, and the screen image can be viewed by the image receiving device directly through the first mirror.

11. An image transfer device as recited in claim 10, and further comprising adjustment means for adjusting the position of said projector platform relative to said screen.

12. An image transfer device as recited in claim 11, and further comprising adjustment means for adjusting the position of said camera platform relative to said screen.

13. An image transfer device as recited in claim 12, and further comprising adjustment means for adjusting the positions of said first and second mirrors relative to said screen.

14. An image transfer device as recited in claim 10, wherein said first mirror is a 60-40 mirror.

15. An image transfer device as recited in claim 10, wherein said box has a hinged cover.

16. An image transfer device as recited in claim 15, wherein said box includes a floor.

17. An image transfer device as recited in claim 16, wherein the inner surfaces of said walls, cover and floor are black.

* * * * *